United States Patent [19]

Wehnert et al.

[11] Patent Number: 5,066,704

[45] Date of Patent: Nov. 19, 1991

[54] FILLED THERMOPLASTS WITH LOW SHRINKAGE ANISOTROPY

[75] Inventors: Wolfgang Wehnert, Krefeld; Klaus Reinking, Wermelskirchen, both of Fed. Rep. of Germany; Peter Bier, Coraopolis, Pa.; Klaus Kraft; Erhard Tresper, both of Krefeld, Fed. Rep. of Germany

[73] Assignee: Bayer Aktiengesellschaft, Leverkusen-Bayerwerk, Fed. Rep. of Germany

[21] Appl. No.: 526,388

[22] Filed: May 21, 1990

Related U.S. Application Data

[63] Continuation of Ser. No. 303,154, Jan. 27, 1989, abandoned.

[30] Foreign Application Priority Data

Feb. 5, 1988 [DE] Fed. Rep. of Germany ....... 3803475

[51] Int. Cl.$^5$ .............................................. C08F 2/16
[52] U.S. Cl. ..................................... 524/449; 524/451
[58] Field of Search .............................. 524/449, 451

[56] References Cited

U.S. PATENT DOCUMENTS

| | | | |
|---|---|---|---|
| 3,354,129 | 11/1967 | Edmonds et al. | 526/280 X |
| 4,021,596 | 5/1977 | Bailey | 525/537 X |
| 4,365,037 | 12/1982 | Adachi et al. | 524/449 |
| 4,528,335 | 7/1985 | Selby et al. | 525/420 |
| 4,544,700 | 10/1985 | Wright | 524/496 X |
| 4,581,411 | 4/1986 | Liang et al. | 525/189 |

OTHER PUBLICATIONS

Kirk-Othmer, *Encyclopedia of Chemical Technology*, vol. 22; pp. 168–170 (1967).

*Primary Examiner*—Joseph L. Schofer
*Assistant Examiner*—J. M. Reddick
*Attorney, Agent, or Firm*—Connolly and Hutz

[57] ABSTRACT

A composition useful in producing molded articles, fibers and sheet products is a mixture of from 20 to 80% by weight of polyarylene sulphides, from 10 to 60% by weight of glass fibers and from 60 to 10% by weight of mica.

13 Claims, No Drawings

FILLED THERMOPLASTS WITH LOW SHRINKAGE ANISOTROPY

This application is a continuation of U.S. patent application Ser. No. 07/303,154, filed Jan. 27, 1989, now abandoned.

This invention relates to mixtures of polyarylene pulphide, preferably polyphenylene sulphide (PPS), glass fibres and mica, which have a low shrinkage anisotropy.

Polyarylene sulphides and methods for their preparation, and mixtures of these compounds with a wide variety of additives are known in the art (e.g. U.S. Pat. No. 3 354 129, EP-OS 171 021).

The mechanical properties of unreinforced PPS are unsatisfactory for injection moulding and in particular the flexural or tensile strength and modulus of elasticity of these substances are frequently insufficient for practical applications and the processing shrinkage is too high. It has therefore been found advantageous to improve the above mentioned properties of PPS, e.g. by the addition of reinforcing substances, in particular glass fibres. Thus, for example, a PPS reinforced with 40% by weight of glass fibres is available on the market.

These products have, however, the disadvantage over unreinforced PPS of being highly anisotropic in their shrinkage characteristics due to their high glass fibre content. It is known to overcome this disadvantage, for example by adding only mineral, non fibrous fillers. The moulding compounds then obtained, however, do not always give mechanically satisfactory moulded parts (e.g. DE-AS 2 728 233). Moulding compounds of PPS containing 30% by weight of glass fibres and 30% by weight of talc have proved to be advantageous for numerous applications. These products are also commercially available.

The said products, however, also have a high shrinkage anisotropy similar to that of PPS reinforced with 40% by weight of glass fibres.

The use of talc combined with the reduction in the glass content results in an undesirable loss of mechanical properties (flexural strength, edge fibre elongation, (impact) toughness). Products containing glass fibres and talc are nevertheless used in technology on account of their low absolute shrinkage values. The obvious solution of increasing the glass fibre content of these products in order to improve the properties is impracticable since the products already have an unusually high filler content for thermoplasts, which would be expected to give rise to problems in manufacture and processing.

It has now been found that when polyarylene sulphide, preferably PPS, are combined with glass fibres and mica used in about the same proportions by weight as the mixtures of glass fibres and talc used in combination with PPS, the anisotropy of shrinkage can be kept at a level similar to that mentioned for mixtures of glass fibres and talc but at the same time the mechanical properties obtained are improved and may even exceed those of products filled with glass alone.

Another advantage of the mixtures according to the invention is that while the properties can be kept at the level of those obtained with mixtures filled with glass talc, the proportions in the glass/mica filled mixtures according to the invention can now be altered and the glass content lowered to result in mixtures which have a considerably reduced shrinkage anisotropy.

The present invention therefore relates to low shrinkage mixtures of
A) from 20 to 80% by weight of polyarylene sulphide, preferably PPS,
B) from 10 to 60% by weight, preferably from 15 to 50% by
C) from 60 to 10% by weight, preferably from 15 to 50% by weight of mica, the percentages by weight being based on the sum of the weight of components A+B+C, and optionally from 0 1 to 10% by weight of other, conventional additives, based on the weight of the sum of components A+B+C.

Moulded articles produced from the mixtures according to the invention have good mechanical properties and excellent isotropy.

According to the invention, commercial glass fibres optionally sized by conventional methods are employed. They have a diameter of from 1.5 to 17 $\mu m$, preferably from 5 to 13 $\mu m$. Their length is from 0.01 to 30 mm, preferably from 0.05 to 10 mm. They may be used in the form of endless fibres and/or produced by methods giving rise to fibres having a length of from 2 to 10 mm, preferably from 3 to 5 mm, in the final mixture.

Ordinary commercial mica, optionally pretreated in any usual manner, may be used according to the invention. The average particle diameter is from 0.001 to 1 mm and the thickness of the particles is from 0.0001 to to 0.1 mm.

Other conventional additives may also be used, e.g. conventional pigments, mould release agents (e.g. E wax), stabilizers, other mineral fillers, etc.

The mixtures according to the invention may be worked up into moulded parts, fibres and sheet products, etc. by the usual procedures. The mixtures according to the invention are in general advantageously used wherever thermoplastically processible compounds are used.

EXAMPLE 1

Preparation of a mixture according to the invention.

40 parts by weight of PPS (e.g. prepared according to EP-OS 171 021) were mixed with 30 parts by weight of commercially available sized choppedglass fibres CS 7916, 10 $\mu m$ in diameter, of 8layer A0 and with 30 parts by weight of commercial mica (Micro Mica Wl ® Norwegian Talc in which 91% by weight of the particles are smaller than 10 $\mu m$) in a ZSK 30 ©f Werner and Pfleiderer at 320° C.

The mixture was injected molded to form rods measuring 80×10×4 mm and shrinkage measuring plates measuring 80×150×3 mm having their injection gate at the narrow side.

The flexural strength, edge fibre elongation and flexural-E modulus as well as the impact strength (reversed notched) were determined. The processing shrinkage was taken to be the difference between the dimensions of the mould and the dimensions of the injection moulded part cooled to 20° C., the measurements being taken in the longitudinal direction of flow and transversely to the direction of flow. The degree of anisotropy was calculated from the ratio of the relative shrinkage in the transverse direction to the relative shrinkage in the longitudinal direction.

EXAMPLE 2

The components were mixed as in Example 1 but consisted of 40 parts by weight of PPS, 15 Parts by weight of glass fibres and 45 parts by weight of mica.

Comparison of the mechanical properties
a) unmixed, pure PPS
b) commercial pPS only mixed with glass fibres
c) commercial PPS mixed with glass fibres and talc.

|  | Glass Fibres (% by weight) | Talc (% by weight) | Flexural Strength (MPa) | Modulus in Flexure (MPa) |
| --- | --- | --- | --- | --- |
| (a) PPS (unreinforced) | — | — | 125 | 3,000 |
| (b) Ryton ®, Type R4 | 40 | — | 200 | 12,000 |
| (c) Tedur ®, KU 1-9521 | 30 | 30 | 160 | 17,000 |

|  | Edge Fibre Elongation (%) | Impact Strength $a_n$ (kJ/m$^2$) | Degree of Anisotropy$^d$ |
| --- | --- | --- | --- |
| Ryton ® (Phillips) | 1.5 | 16 | 2.5 |
| Tedur ® (Bayer) | 1.1 | 10 | 2.6 |

$^d$(relative shrinkage in transverse direction)/(relative shrinkage in longitudinal direction)

| Example | Glass Fibres (% by weight) | Mica (% by weight) | Flexural Strength (MPa) | Edge Fibre Elongation (%) |
| --- | --- | --- | --- | --- |
| 1 | 30 | 30 | 252 | 1.5 |
| 2 | 15 | 45 | 183 | 1.15 |

| | Impact Strength (kJ/m$^2$) | Degree of Anisotropy (shrinkage transverse/ longitudinal) | Modulus in Flexure (MPa) |
| --- | --- | --- | --- |
| 1 | 26 | 2.5 | 17,400 |
| 2 | 17 | 1.9 | 17,900 |

We claim:

1. A mixture comprising:
   A) from 20 to 80% by weight of polyarylene sulphide,
   B) from 10 to 60% weight of glass fibers and
   C) from 60 to 10% by weight, of commercial mica MICRO MICA W1® which is Norwegian talc containing about 91% by weight of particles smaller than 10 μm, the percentages by weight being based on the sum of the weight of components A+B+C.

2. A mixture comprising:
   A) from 20 to 80% by weight of polyarylene sulphide,
   B) from 10 to 60% by weight of glass fibers and
   C) from 60 to 10% by weight, of MICRO MICA W1 which is mica containing about 91% by weight of particles smaller than 10 μm,
   the percentages by weight being based on the sum of the weight of components A+B+C.

3. Mixture according to claim 2, characterised in that polyphenylene sulphide is used.

4. Mixture according to claim 2, characterised in that the glass fibers are sized.

5. Mixture according to claim 2, characterised in that the mica is pretreated.

6. Mixture according to claim 2, characterised in that the mixture further comprises from 0.1 to 2% by weight of mould release agents.

7. Mixture according to claim 6, characterised in that the mould release agent is E wax.

8. Mixture according to claim 2 wherein B) is 15 to 50% by weight.

9. Mixture according to claim 2 wherein C) is 15 to 50% by weight.

10. Mixture according to claim 2 wherein A) is polyphenylene sulphide, the amount of B) is 15 to 50% by weight and the amount of C) is 15 to 50% by weight.

11. Moulded articles which comprise the mixture according to claim 2.

12. Moulded sheet form articles which comprise the mixture according to claim 2.

13. Fiber form articles which comprise the mixture according to claim 2.

* * * * *